March 24, 1970     D. A. DAVIS ET AL     3,502,059

ADJUSTABLE GEAR TRAIN

Filed March 20, 1968     2 Sheets-Sheet 1

INVENTORS
Dennis A. Davis &
Harold A. Little

Robert J. Outland
ATTORNEY

March 24, 1970     D. A. DAVIS ET AL     3,502,059

ADJUSTABLE GEAR TRAIN

Filed March 20, 1968     2 Sheets-Sheet 2

INVENTORS
Dennis A. Davis, &
BY   Harold A. Little
Robert J. Outland
ATTORNEY

United States Patent Office 3,502,059
Patented Mar. 24, 1970

3,502,059
ADJUSTABLE GEAR TRAIN
Dennis A. Davis, Rochester, and Harold A. Little, Dearborn, Mich., assignors to General Motors Corporation, Detroit, Mich., a corporation of Delaware
Filed Mar. 20, 1968, Ser. No. 714,483
Int. Cl. F16h 55/18; F01l 1/00
U.S. Cl. 123—90                    6 Claims

ABSTRACT OF THE DISCLOSURE

The preferred embodiment comprises a V-type engine having a gear train connecting the crankshaft with overhead camshafts mounted on cylinder heads which are separable from the engine cylinder banks. Center distances between all engaging gears except the idler and camshaft gears are fixed by mounting in the cylinder block or by tying together with connector brackets. The connector brackets permit movement of idler gear centers in each bank to provide a single adjustment of gear lash for each cylinder bank.

FIELD OF THE INVENTION

This invention relates to gear trains and more particularly to gear trains having means for adjusting backlash, especially for use as camshaft drive means for an internal combustion engine.

DESCRIPTION OF THE PRIOR ART

It is known in the art to use a train of gears for purposes such as to drive the camshaft of an overhead camshaft engine and to provide some means for setting or adjusting the backlash of the gears in the gear train. In one known arrangement, the engine cylinder heads, cylinder block and gear train cover are first assembled and the bearing supports for the gears are then machined in place so that upon installation of the gear train, the backlash will be within acceptable limits. If, however, replacement of a cylinder head or other component of such an engine is necessary due to damage or wear, it is necessary to remachine the bearing seats after installation to be assured of proper lash in the gear train.

Prior art gear trains are known which avoid this necessity by mounting an idler gear on an adjustable bracket or other means so as to provide for adjustment of the idler with respect to its mating gears. While this eliminates the necessity of remachining the block and head assembly, the adjustment of lash is made difficult by the fact that the center distances between both the idler and its mating gears must be properly set before the idler gear is secured in position.

SUMMARY OF THE INVENTION

The present invention provides a gear train having adjustable idler means arranged to simplify the adjustment of backlash. To accomplish this, a drive gear rotatable on an axis fixed with respect to one member, such as the cylinder block, is connected to an idler gear by a connector which determines the center distance and thus presets the backlash between these gears. The connector is pivotable about the axis of the drive gear so as to move the axis of the idler gear with respect to a driven gear and thus permits adjustment of the backlash between them. An adjustable bracket provides for locking the idler gear axis in its properly adjusted position after adjustment is completed and the connector may also be secured to a cover member to better support the various gears.

In an internal combustion engine of the V-type, for example, the invention may provide adjustable idler trains between the camshafts of each bank and a common idler gear driven by a drive gear on the engine crankshaft. A speed reduction may be accomplished within the gear train by providing different sized idler gears on the same shaft as well as by differences in sizes between the crankshaft and camshaft mounted gears.

These and other features of the present invention will be more apparent from the following description of a preferred embodiment chosen for purposes of illustration.

BRIEF DECRIPTION OF THE DRAWINGS

DESCRIPTION OF THE PREFERRED EMBODIMENT

Figure 1:
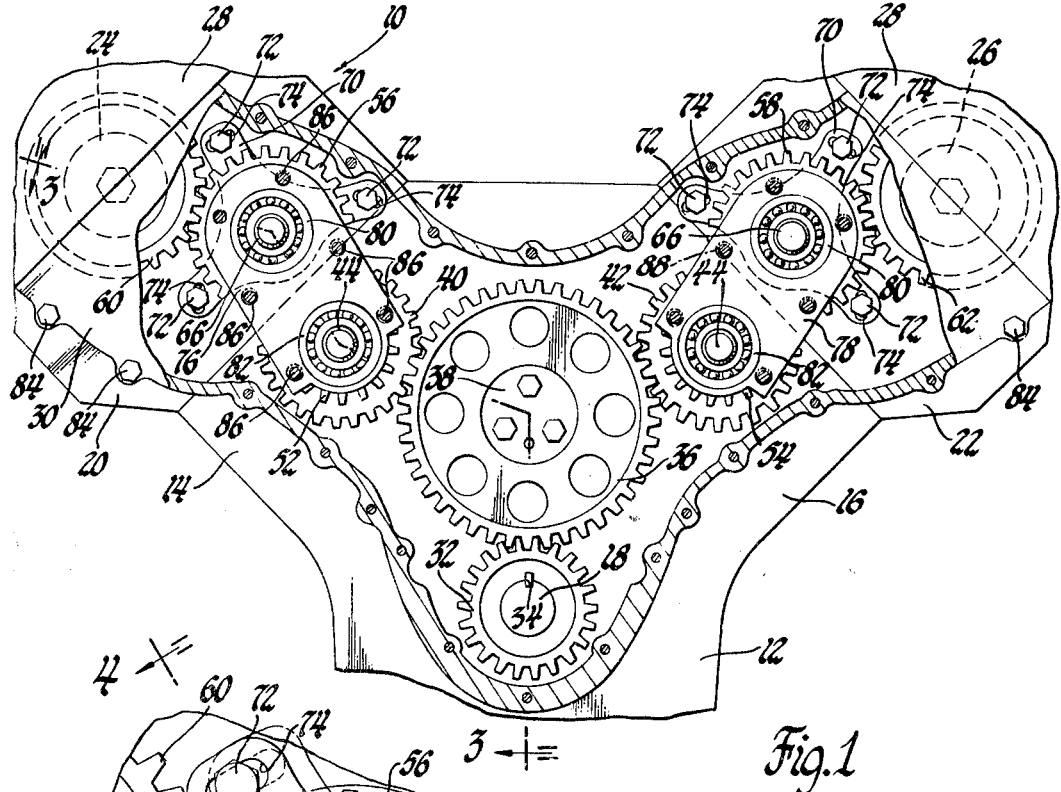
FIGURE 1 is an end view of an internal combustion engine having a camshaft drive train with backlash adjusting means according to the invention and having portions of the gear train cover removed.
Figure 2:
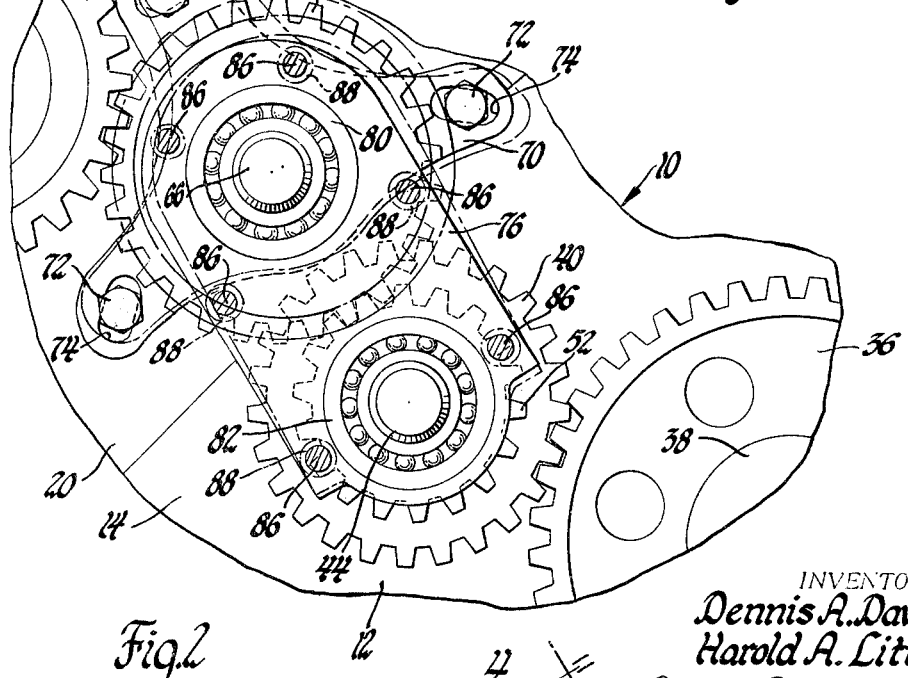
FIGURE 2 is an enlarged view of a portion of FIGURE 1 showing one of the adjustable idler mechanisms.
Figure 3:
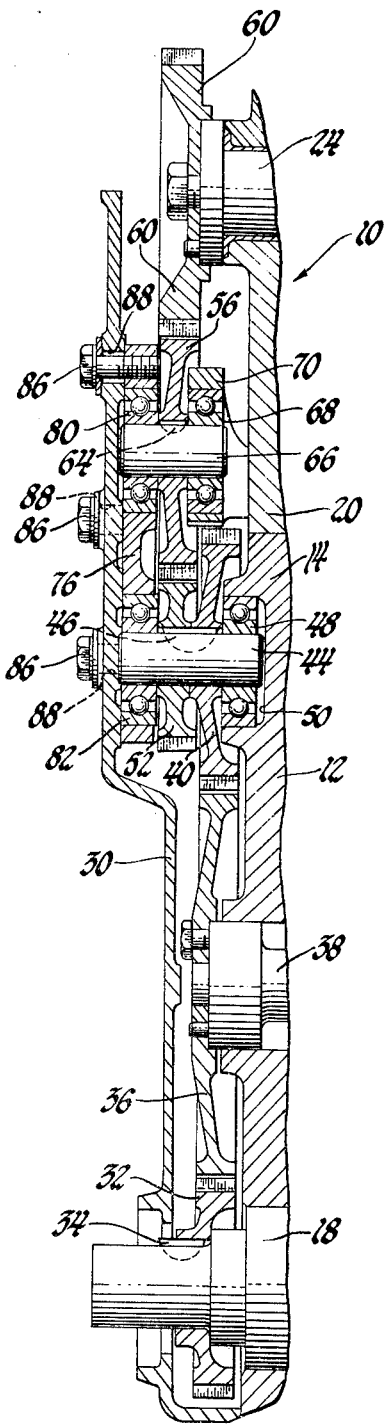
FIGURE 3 is a transverse cross-sectional view taken generally in the plane indicated by the line 3—3 of FIGURE 1 and showing the engagement of various gears of the gear train.
Figure 4:
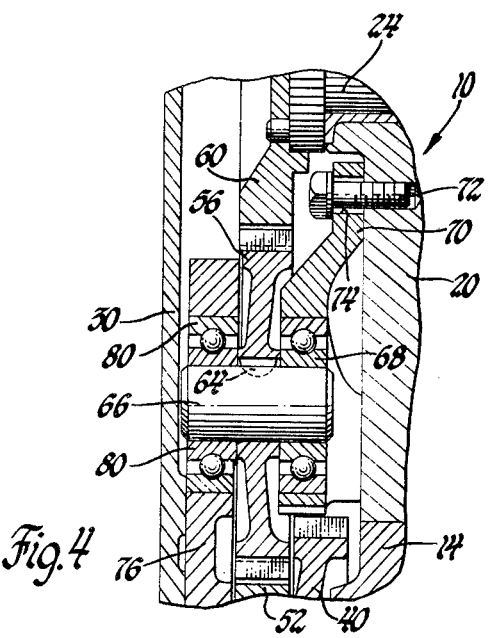
FIGURE 4 is a fragmentary cross-sectional view taken in the plane indicated by the line 4—4 of FIGURE 2 and showing the manner of mounting one of the adjustable idler gears and FIGURE 5 is a pictorial view of the adjustable idler gears and their connector and securing brackets.
Figure 5:
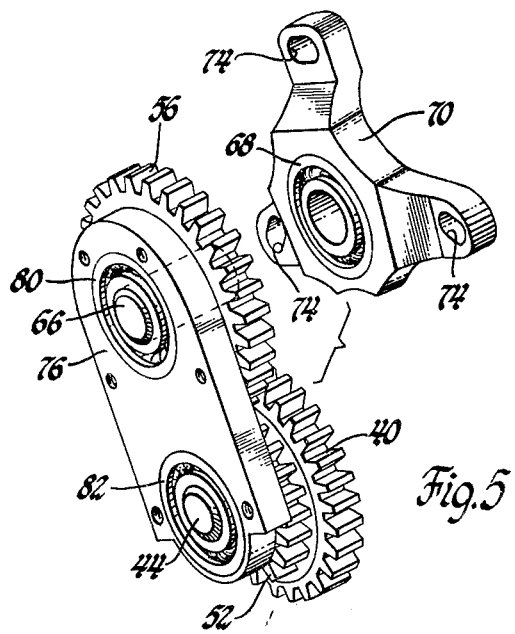

Referring now to the drawings with more particularity, numeral 10 generally indicates an internal combustion engine of the V-type having a cylinder block 12 including a pair of angularly disposed cylinder banks 14 and 16, respectively, and rotatably journaling a crankshaft 18. At the outer ends of the cylinder banks 14, 16 are mounted cylinder heads 20 and 22, respectively.

Rotatably carried on cylinder heads 20 and 22 are overhead camshafts 24 and 26, respectively, which are arranged to operate the engine valves (not shown). Camshafts 24, 26 are enclosed by valve covers 28 and a gear train cover 30, which also encloses a gear train arranged to drive the camshafts from the chankshaft.

The camshaft drive gear train includes a drive gear 32 drivingly secured to the end of the crankshaft and indexed by a key 34. Drive gear 32 engages a main idler gear 36 which is secured to a shaft 38 journaled in the cylinder block 12. Idler gear 36, in turn, engages a pair of idler driven gears 40 and 42 which are located near the ends of cylinder banks 14, 16, respectively.

Gears 40, 42 are mounted for rotation with shafts 44 and are indexed by means of keys 46. The inner ends of shafts 44 are carried in ball bearings 48 which are seated in bearing recesses 50 of the cylinder block 12, thus fixing the rotational axes of gears 40 and 42. Mounted coaxially on shafts 44, and secured by keys 46 to the shafts and to gears 40 and 42 respectively, are a pair of idler drive gears 52 and 54. Gears 52, 54 are smaller in diameter than gears 40, 42 so as to effect a speed reduction in the gear train.

The idler drive gears 52, 54 in turn, engage a pair of idler gears 56, 58, respectively. These, in turn, engage driven gears 60, 62, respectively, which are mounted on the ends of camshafts 24, 26, respectively.

Idler gears 56, 58 are indexed by keys 64 to shafts 66, the inner ends of which are carried in ball bearings 68 received in adjustable brackets 70. Brackets 70 are adjustably secured to their respective cylinder heads 20, 22 by means of bolts 72 extending through slotted openings 74 of the brackets.

The outer ends of shafts 66 and 44, which carry engaging idler and idler drive gears, are connected together by connector brackets 76 and 78. These retain ball bearing assemblies 80, 82 journaling the outer ends of shafts 66 and 44, respectively. Connector brackets 76, 78 provide fixed center distances between the idler gears and their respective idler drive and driven gears while permitting the idler gears to be moved around the axes of rotation of the idler drive gears by rotation to the extent permitted by the slotted openings 74 of brackets 70. This permits the adjustment of lash between idler gears 56, 58 and their respective camshaft driven gears 60, 62, the lash of the remaining gears of the train being predetermined by the machining of the cylinder block and the connector brackets.

Upon final assembly of the gear train, the adjustment of lash is followed by the securing of brackets 70 to fix the positions of idler gears 56, 58. Cover member 30 is then installed in place on the cylinder block by suitable means such as bolts 84. The connector brackets 76, 78 are then bolted to the cover 30 by bolts 86 which are received in suitably elongated openings 88 of the cover 30.

With the foregoing arrangement, the center distance and hence the proper backlash of the majority of gears in the gear train is predetermined in the manufacture of the parts. The machining of the cylinder block, for example, controls the center distance of the main drive gear 32 to the main idler gear 36 as well as the center distances of idler gear 36 to the idler drive gears 40 and 42. This properly determines the backlash between these gears. The center distance between idler drive gears 52, and 54 and their respective idler gears 56, 58 are controlled by the machining of the connector brackets 76, 78 which results in a proper backlash being automatically obtained for these gears in their assembly.

Thus, the only adjustments of backlash required are between idler gears 56, 58 and their respective camshaft driven gears 60, 62 and these are accomplished as previously noted by swinging the axes of idler gears 56, 58 around the axes of their respective idler drive gears 52, 54 as permitted by connector brackets 76, 78 until a proper lash setting is reached. These gears are then secured in place by tightening bolts 74 to secure the appropriate adjustable bracket 70 to its cylinder head. The assembly of cover 30 and the securing of connector brackets 76, 78 to the cover merely acts to strengthen the complete assembly, the positions of the gears having been fixed by the previous assembly steps.

While the adjustable gear train features have been shown in conjunction with a preferred embodiment of a V-type internal combustion engine, it is apparent that numerous modifications in the concepts disclosed herein could be made by those skilled in the art within the spirit and scope of the invention as disclosed. Accordingly, it is intended that the invention not be limited except in accordance with the language of the following claims.

What is claimed is:

1. A camshaft drive train for an internal combustion engine having a cylinder block rotatably mounting a crankshaft member and a cylinder head removably fixed on said cylinder block and rotatably mounting a camshaft member, said drive train constituting the driving connection from said crankshaft to said camshaft and comprising a first gear drivingly connected with one of said crankshaft and camshaft members and rotatable on an axis fixed with respect to the means mounting said one member, a second gear drivingly connected with the other of said crankshaft and camshaft members and rotatable on an axis fixed with respect to the means mounting said other member, a third gear rotatable on a movable axis and engaging said first and second gears to drivingly interconnect them, connector means extending between the second and third gears and maintaining a fixed distance between the axes thereof, said connector means being pivotable about the axis of said second gear to move the axis of said third gear and thereby adjust the lash between said first and third gears and adjustable bracket means securing said third gear to the assembly of said cylinder head and said block to fix the axis of said third gear in one of a plurality of possible adjustment positions.

2. A camshaft drive train for an internal combustion engine having a cylinder block rotatably mounting a crankshaft and including a pair of angularly disposed cylinder banks, removable cylinder heads for each bank and a camshaft rotatably mounted in each cylinder head, said drive train constituting the driving connection from said crankshaft to both said camshafts and comprising a driven gear for each bank mounted on the end of its respective camshaft for rotation therewith, an idler drive gear for each bank, each rotatably secured to the cylinder block on an axis fixed with respect thereto and drivingly connected with said crankshaft, an idler gear for each bank, each rotatable on a movable axis and engaging its respective idler drive gear and driven gear to drivingly interconnect them, connector means for each bank, each extending between and fixing the center distance of the idler and idler drive gears of its respective bank, said connector means each being pivotable about the axis of its respective idler drive gear to move the axis of its idler gear so as to adjust the lash between the respective idler and driven gears and adjustable bracket means for each bank and connecting with means supporting its respective idler gear, said bracket means being adjustably securable to the cylinder head and block assembly to fix the axes of their respective idler gears in one of a plurality of possible adjustment positions.

3. A camshaft drive train for an internal combustion engine having a cylinder block rotatably mounting a crankshaft and including a pair of angularly disposed cylinder banks, cylinder heads for each bank and a camshaft rotatably mounted in each cylinder head, said drive train being arranged to connect with crankshaft with both said camshafts and comprising a driven gear for each bank mounted on the end of its respective camshaft for rotation therewith, an idler drive gear for each bank, each rotatably secured to the cylinder block on an axis fixed with respect thereto and drivingly connected with said crankshaft, an idler gear for each bank, each rotatable on a movable axis and engaging its respective idler drive gear and driven gear to drivingly interconnect them, connector means for each bank, each extending between and fixing the center distance of the idler and idler drive gears of its respective bank, said connector means each being pivotable about the axis of its respective idler drive gear to move the axis of its idler gear so as to adjust the lash between the respective idler and driven gears, a main drive gear secured to the end of said crankshaft, a main idler gear rotatably mounted on said cylinder block and engaging said main drive gear and an idler driven gear for each bank and each coaxially mounted with its respective idler drive gear for rotation therewith, said idler driven gears each engaging said main idler gear and being of larger diameter than their respective idler drive gears, whereby said camshaft mounted driven gears are rotatably driven by said main drive gear with a speed reduction being accomplished by said idler drive and driven gears.

4. The camshaft driven train of claim 3 and further including an adjustable support bracket for each bank and connecting with means supporting its respective idler gear, said brackets being adjustably securable to their respective cylinder heads to fix the axis of their respective idler gears in one of a plurality of possible adjustment positions.

5. A camshaft drive train for an internal combustion engine having a cylinder block rotatably mounting a crankshaft member and a cylinder head removably fixed on said cylinder block and rotatably mounting a camshaft member, said drive train being arranged to drivingly connect said crankshaft with said camshaft and comprising
- a driven gear mounted on the end of said camshaft for rotation therewith,
- a drive gear mounted on the end of said crankshaft for rotation therewith,
- an idler drive gear drivingly connected with said crankshaft mounted drive gear and rotatably carried by a shaft having one end received in and fixedly positioned by said cylinder block,
- an idler gear rotatably carried by a second shaft having one end received and movably positioned by adjustable bracket means securable in a plurality of positions to the assembly of said cylinder head and block, said idler gear engaging said idler drive gear and said crankshaft mounted driven gear to drivingly interconnect them,
- connector means receiving the other ends of both said idler gear and idler drive gear shafts and maintaining a fixed center distance between them so as to maintain a predetermined lash between the idler and idler drive gears, said connector means being pivotable about the fixed axis of said idler drive gear shaft to arcuately move the axis of said idler gear shaft within the range of adjustment positions of said bracket means so as to adjust as desired the lash between the idler and driven gears, such lash being maintained by fixing said bracket means in one of its adjustment positions.

6. The camshaft drive train of claim 5 wherein said engine includes
- cover means at least in part enclosing said drive train and fixed to the assembly of said cylinder head and block and
- means for securing said connector means to said cover means to strengthen the support provided for said other ends of the idler and idler drive gear shafts so as to better support their respective gears.

References Cited
UNITED STATES PATENTS

| | | |
|---|---|---|
| 1,148,478 | 7/1915 | Jepson. |
| 2,513,217 | 6/1950 | Tomlines _____ 74—409 |
| 3,338,229 | 8/1967 | De Lorean et al. |
| 3,361,000 | 1/1968 | Buchwald. |
| 3,422,806 | 1/1969 | De Lorean. |

AL LAWRENCE SMITH, Primary Examiner

U.S. Cl. X.R.
74—409; 123—195